(12) United States Patent
Yamazaki

(10) Patent No.: US 9,163,801 B2
(45) Date of Patent: Oct. 20, 2015

(54) LAMP CONTROL SYSTEM AND CONTROL DEVICE

(71) Applicant: KOITO MANUFACTURING CO., LTD., Tokyo (JP)

(72) Inventor: Masashi Yamazaki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 154 days.

(21) Appl. No.: 13/970,995

(22) Filed: Aug. 20, 2013

(65) Prior Publication Data
US 2014/0056012 A1    Feb. 27, 2014

(30) Foreign Application Priority Data

Aug. 21, 2012  (JP) ................................. 2012-182389

(51) Int. Cl.
*B60Q 1/00* (2006.01)
*F21S 8/10* (2006.01)
*B60Q 1/14* (2006.01)

(52) U.S. Cl.
CPC ............. *F21S 48/1705* (2013.01); *B60Q 1/143* (2013.01); *B60Q 2300/056* (2013.01); *B60Q 2300/41* (2013.01); *B60Q 2300/42* (2013.01)

(58) Field of Classification Search
CPC ........... F21S 48/1763–48/1794; B60Q 1/0023; B60Q 1/1438
USPC .................. 362/464–468, 512–515, 538–539
See application file for complete search history.

(56) References Cited

U.S. PATENT DOCUMENTS

| 2011/0267455 | A1 | 11/2011 | Gotz et al. | |
| 2013/0218413 | A1* | 8/2013 | Tanaka et al. | ................... 701/36 |

FOREIGN PATENT DOCUMENTS

| DE | 102007040042 A1 | 2/2009 |
| DE | 102008039091 A1 | 5/2009 |
| EP | 2338731 A1 | 6/2011 |
| JP | 2008114800 A | 5/2008 |
| JP | 2011016505 A | 1/2011 |

(Continued)

OTHER PUBLICATIONS

Extended European Search Report issued in corresponding European Application No. 13180658.0, mailed Oct. 21, 2013 (9 pages).

(Continued)

*Primary Examiner* — Sean Gramling
(74) *Attorney, Agent, or Firm* — Osha Liang LLP

(57) ABSTRACT

A lamp control system includes: a lamp configured to form a light distribution pattern ahead of a vehicle using a non-illumination region forming unit, wherein the light distribution pattern includes a non-illumination region, and the illumination region includes at least one longitudinal cutoff line; a detector configured to detect a front vehicle in front of the vehicle; an information acquiring unit configured to acquire a displacement direction and a displacement speed of the front vehicle; and a light distribution controller configured to control the light distribution pattern using the non-illumination region forming unit such that the front vehicle is positioned in the non-illumination region. When the front vehicle is approaching the longitudinal cutoff line, the light distribution controller controls the light distribution pattern based on the displacement direction and the displacement speed to increase an interval between the longitudinal cutoff line and the front vehicle.

9 Claims, 7 Drawing Sheets

(56) References Cited

FOREIGN PATENT DOCUMENTS

| | | | |
|---|---|---|---|
| WO | 2012063365 A1 | 5/2012 | |
| WO | WO 2012/063365 A1 | * | 5/2012 |

OTHER PUBLICATIONS

Espacenet Patent Abstract for Japanese Publication No. 2008-114800 (2 pages).

* cited by examiner

LAMP CONTROL SYSTEM AND CONTROL DEVICE

CROSS-REFERENCE TO RELATED APPLICATION

This application claims priority from Japanese Patent Application No. 2012-182389, filed on Aug. 21, 2012, the entire contents of which are hereby incorporated by reference.

BACKGROUND

1. Technical Field

The present disclosure relates to a system and a control device for controlling the light distribution of lamps which illuminate a front region of a vehicle.

2. Related Art

Among systems of the above kind, there is a system which is equipped with a headlight which can emit a low beam and a high beam, a non-illumination region forming unit for forming a non-illumination region by blocking a portion of the high beam, and a detector for detecting a front vehicle (a preceding vehicle or an oncoming vehicle) based on an image of a front region captured by a camera (see JP-A-2011-16505, for example). Glare given to the front vehicle can be suppressed by controlling the non-illumination region forming unit so that the detected front vehicle is positioned in the non-illumination region. Meanwhile, a region other than the non-illumination region continues to be illuminated with the high beam, whereby the sufficient visibility of the front region is secured.

For example, when a vehicle is running on a curved road, the relative position of a front vehicle is varied to a large extent in the left-right direction and the front vehicle may deviate from a non-illumination region. In this case, a portion of high beam may give glare to the front vehicle. To solve this problem, the system disclosed in JP-A-2011-16505 is configured such that when running on a curved road is detected, high-beam illumination by at least one of the left and right headlights is stopped. In other words, the entire high-beam illumination region is made a non-illumination region. In this case, although it is possible to prevent the driver of the front vehicle from being given glare, the visibility of the front vehicle is unavoidably lowered.

SUMMARY OF THE INVENTION

One or more illustrative aspects of the present invention are to provide a technique which enables both of suppression of glare given to a front vehicle and securing of high visibility of a front region even in such running state that the relative position of the front vehicle with respect to the vehicle is varied to a large extent in the left-right direction.

According to one or more illustrative aspects of the present invention, there is provided a lamp control system. The lamp control system comprises: a lamp configured to form a light distribution pattern ahead of a vehicle using a non-illumination region forming unit, wherein the light distribution pattern comprises an illumination region and a non-illumination region, and the illumination region comprises at least one longitudinal cutoff line at a boundary between the illumination region and the non-illumination region; a detector configured to detect a front vehicle in front of the vehicle; an information acquiring unit configured to acquire a displacement direction and a displacement speed of the front vehicle; and a light distribution controller configured to control the light distribution pattern using the non-illumination region forming unit such that the front vehicle detected by the detector is positioned in the non-illumination region. When the front vehicle is approaching the longitudinal cutoff line, the light distribution controller controls the light distribution pattern based on the displacement direction and the displacement speed so as to increase an interval between the longitudinal cutoff line and the front vehicle.

With the above configuration, when displacement of a front vehicle in a certain direction is detected, the interval between the front vehicle and a boundary line of the non-illumination region located on the destination side of the displacement direction is increased actively so that the boundary line of the non-illumination region goes away from the front vehicle. Therefore, a larger margin of separation of the boundary line of the non-illumination region from the front vehicle can be secured than in the conventional follow control which attempts to maintain a constant interval, while suppressing the control load. Therefore, even in such running states that the relative position of the detected vehicle varies to a large extent in the left-right direction, the probability that the driver/passenger of the front vehicle suffers glare due to illumination light of the lamp can be decreased greatly. Furthermore, since the interval control does not change the illumination region itself formed by the lamp, the visibility of regions around the non-illumination region is not lowered.

DETAILED DESCRIPTION

Figure 1:
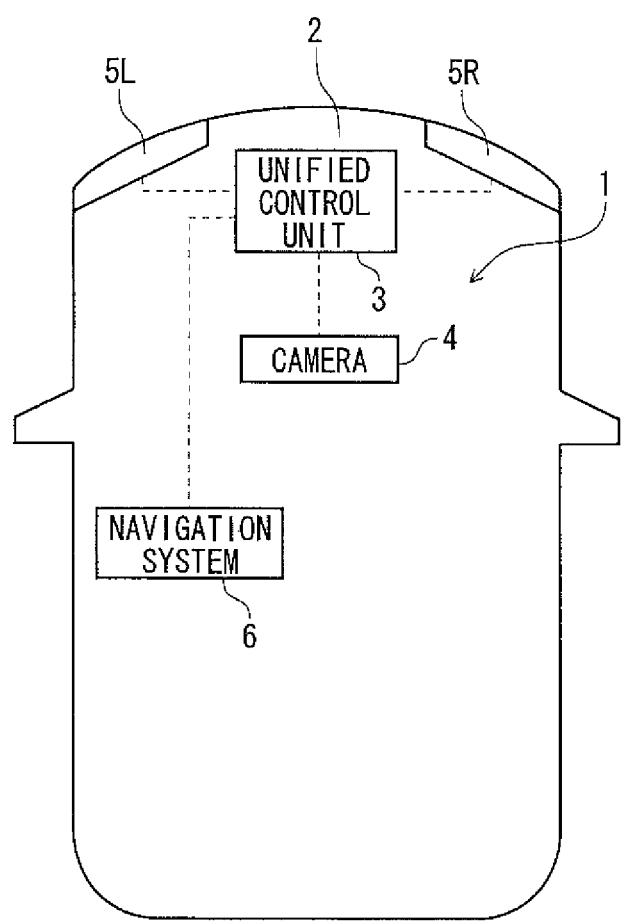
FIG. 1 schematically shows a control system according to an embodiment of the present invention.

Hereinafter, the present invention will be described based on preferred embodiments with reference to drawings. The same reference numerals are attached to the same or equivalent components and members shown in each drawing, and overlapped descriptions are appropriately omitted. Moreover, the embodiments do not limit the present invention but exemplify the invention, and all characteristics described in embodiments or combinations thereof are not necessarily the essentials of the invention.

FIG. 1 schematically shows the entire configuration of a vehicle 2 which is provided with a control system 1 according to an embodiment of the invention. The control system 1 (lamp control system) includes a unified control unit 3, a camera 4, a right headlight 5R, a left headlight 5L, and a navigation system 6.

The unified control unit 3, which performs various controls for the vehicle 2, includes a CPU which performs various kinds of computation, a ROM which is stored with various control programs, and a RAM which is used for data storage and as a work area while a program is executed.

The camera 4 includes an imaging device such as a CCD (charge-coupled device) sensor or a CMOS (complementary metal oxide semiconductor) sensor and is disposed at the center in the left-right direction of the vehicle 2. More specifically, the camera 4 is attached to the back surface of the room mirror (hence it is directed forward) and is configured to capture an image of a front region of the vehicle 2. The camera 4 is connected to the unified control unit 3 so that the camera 4 and the unified control unit 3 communicate with each other. The camera 4 is configured to send acquired image data to the unified control unit 3.

The navigation system 6 is a known UPS information acquisition system which acquires information relating to a running position and direction of the vehicle 2 together with information of a map of a neighborhood and other information. The navigation system 6 is connected to the unified control unit 3 so that the navigation system 6 and the unified control unit 3 communicate with each other. The navigation system 6 is configured to send acquired GPS information to the unified control unit 3.

The right headlight 5R and the left headlight 5L are disposed at front-right and front-left positions of the vehicle 2, respectively. In the following description, when necessary, the right headlight 5R and the left headlight 5L are referred to generically as a headlight 5.

Figure 2:
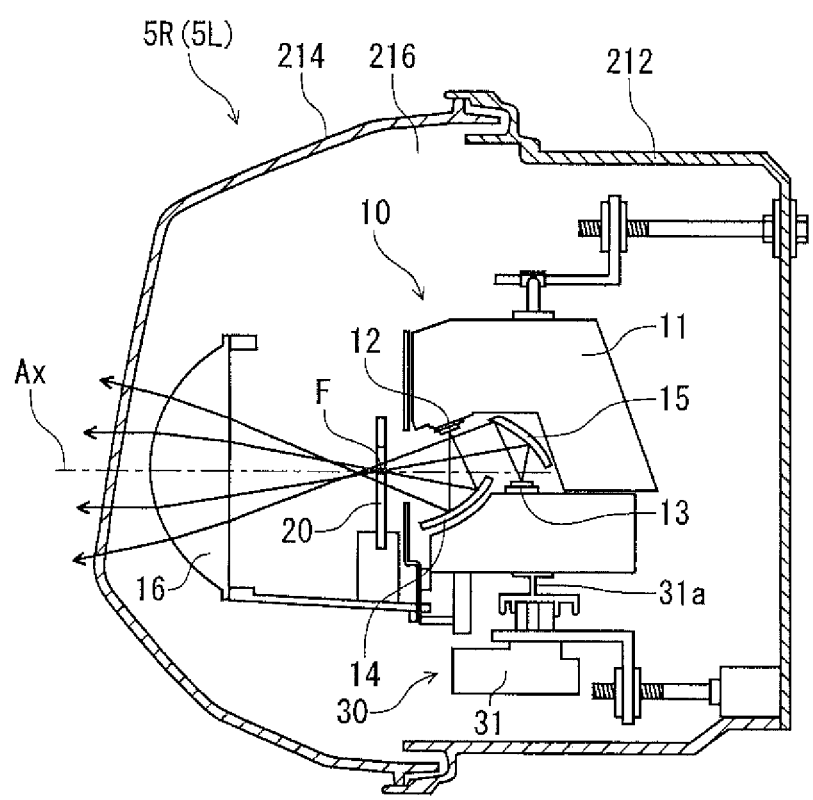
FIG. 2 is a vertical sectional view schematically showing the internal structure of a headlight of the control system.

FIG. 2 is a schematic sectional view showing the internal structure of the right headlight 5R. The left headlight 5L has approximately the same structure as the right headlight 5R and hence is not given a similar drawing or will not be described in detail.

The headlight 5 is a lamp for illuminating a front region of the vehicle 2, and is equipped with a housing 212 and a transparent cover 214 which is attached to the housing 212 and defines a lamp room 216. A lamp unit 10 for emitting light forward is provided in the lamp room 216.

The lamp unit 10 includes a base 11, a high-beam light source 12, a low-beam light source 13, a high-beam reflector 14, a low-beam reflector 15, a projection lens 16, a shade mechanism 20, and a swivel mechanism 30.

The high-beam light source 12 is attached to the base 11 with its light-emitting surface down. Light emitted from the high-beam light source 12 is reflected forward by the high-beam reflector 14 which is attached to the base 11 to face the high-beam light source 12. The low-beam light source 13 is attached to the base 11 with its light-emitting surface up. Light that is emitted from the low-beam light source 13 is reflected forward by the low-beam reflector 15 which is attached to the base 11 to face the low-beam light source 13. Reflection light reflected from each of the high-beam reflector 14 and the low-beam reflector 15 is projected forward along the lamp optical axis Ax via the projection lens 16 which is a convex lens.

In the embodiment, the high-beam light source 12 and the low-beam light source 13 are LEDs. Each of the high-beam reflector 14 and the low-beam reflector 15 has an elliptical reflection surface.

Figure 3:
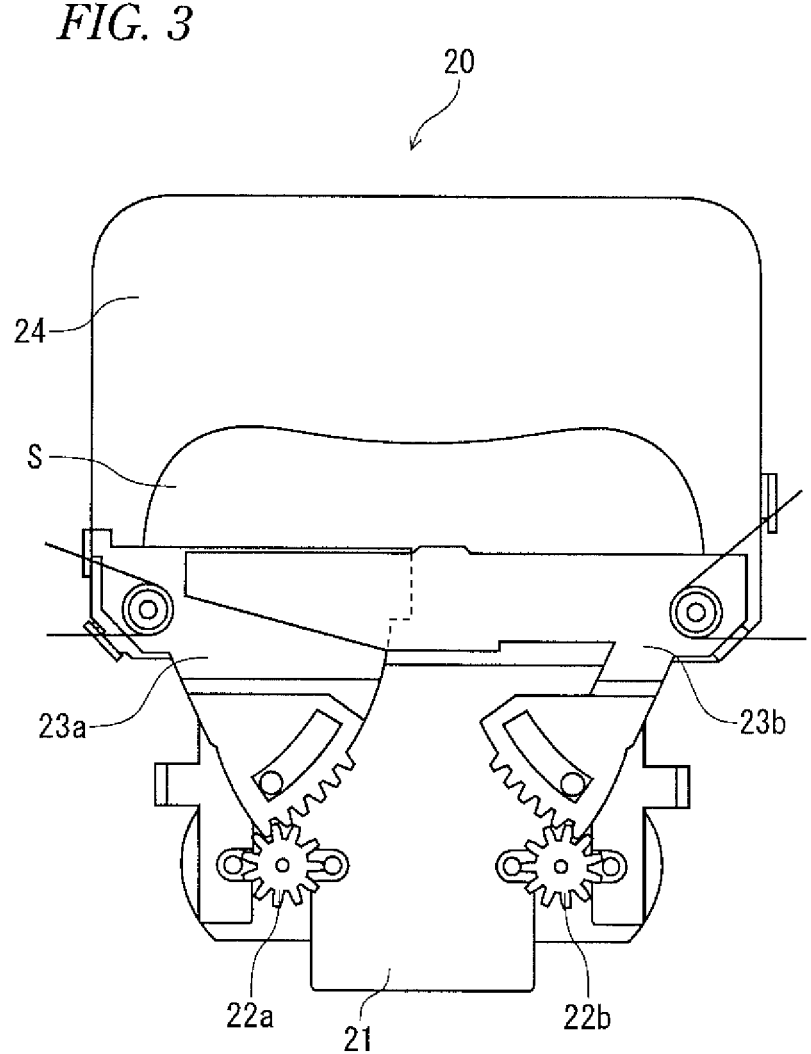
FIG. 3 is a front view showing the structure of a shade mechanism mounted in each headlight.

The shade mechanism 20 capable of blocking a portion of light emitted from each of the high-beam light source 12 and the low-beam light source 13 is disposed in the vicinity of the rear focal point F of the projection lens 16. The shade mechanism 20 may be the one shown in FIG. 3.

The shade mechanism 20 includes a frame 21, a pair of gear units 22a and 22b which are connected to an actuator such as a DC motor, a pair of light blocking members 23a and 23b which are attached rotatably to the frame 21 so as to be engaged with the respective gear units 22a and 22b, and a stationary light shield plate 24 which is disposed above the frame 21.

A slit S is formed between the frame 21 and the stationary light shield plate 24. Light emitted from each of the high-beam light source 12 and the low-beam light source 13 reaches the projection lens 16 after passing through the slit S. The light shield portions of the light blocking members 23a and 23b are rotated to enter the region of the slit S to block a portion of light emitted from each of the high-beam light source 12 and the low-beam light source 13.

As shown in FIG. 2, the swivel mechanism 30 for swinging the optical axis Ax of the lamp unit 10 in the left-right direction is attached to the bottom surface of the lamp unit 10. The swivel mechanism 30 is equipped with a swivel actuator 31, and a rotary shaft of the swivel actuator 31 is fixed to a rotary bearing that is attached to a bottom portion of the base 11 of the lamp unit 10. For example, when the vehicle 2 is running on a curved road, the swivel actuator 31 swings the optical axis Ax of the lamp unit 10 in the left-right direction under the control of the unified control unit 3 to illumination regions other than the region right ahead of the vehicle 2 and thereby increase the visibility of those regions.

FIGS. 4A-4E schematically show light distribution patterns that can be formed by the right headlight 5R and the left headlight 5L on a virtual vertical screen located 25 m ahead of the vehicle 2.

As shown in FIG. 4B-4E, each headlight 5 is configured so that light that is emitted from the high-beam light source 12 also illuminates a region over a lateral cutoff line CL and light that is emitted from the low-beam light source 13 illuminates only a region under the lateral cutoff line CL. The unified control unit 3 performs light blocking control on light beams emitted from the high-beam light source 12 and the low-beam light source 13 by controlling the positions of the light blocking members 23a and 23b of the shade mechanism 20.

As a result, each headlight 5 can select one of a high-beam illumination mode in which the entire illumination-possible front region of the vehicle 2 is to be illuminated, a left-side illumination mode in which a region that is over the lateral cutoff line CL and on the right of a left longitudinal cutoff line LCL is made a non-illumination region, a right-side illumination mode in which a region that is over the lateral cutoff line CL and on the left of a right longitudinal cutoff line RCL is made a non-illumination region, and a low-beam illumination mode in which a region over the lateral cutoff line CL is made a non-illumination region.

Figure 4A:
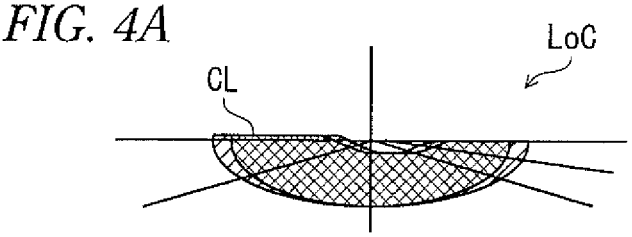
FIGS. 4A-4E schematically show example light distribution patterns that are formed by the control system.

FIG. 4A shows a low-beam light distribution pattern LoC. In the low-beam light distribution pattern LoC, only the region under the lateral cutoff line CL is illuminated to prevent the driver/passenger of a front vehicle or a pedestrian from seeing glare when the vehicle 2 is running in an urban area or the like. This light distribution pattern is formed by turning on only the low-beam light source 13 of each of the left and right lamp units 10 (the high-beam light source 12 is turned of and setting the shade mechanism 20 of each lamp unit 10 in the low-beam illumination mode.

Figure 4B:
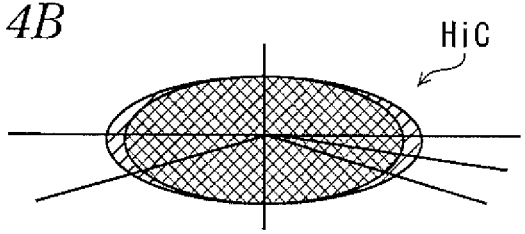

FIG. 4B shows a high-beam light distribution pattern HiC which maximizes the forward field of vision of the driver. This light distribution pattern is formed by turning on both of the high-beam light source 12 and the low-beam light source 13 of each lamp unit 10 and setting the shade mechanism 20 of each lamp unit 10 in the high-beam illumination mode.

Figure 4C:
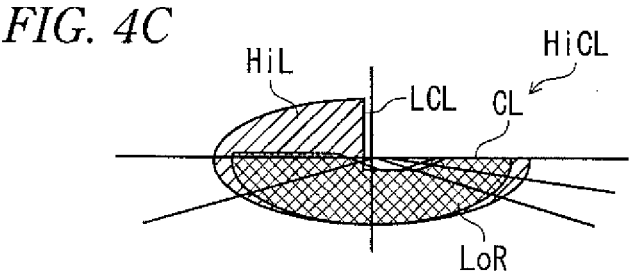

FIG. 4C shows a left-side high-beam illumination pattern HiCL. This light distribution pattern is suitable for a case that no front vehicle or pedestrian exists on its own lane side and an oncoming vehicle or a pedestrian exists on the opposite lane side. This light distribution pattern is to prevent the driver/passenger of an oncoming vehicle or a pedestrian existing on the opposite lane side from seeing glare while increasing the forward visibility of the driver.

The left-side high-beam illumination pattern HiCL is formed by combining a left-side high-beam light distribution pattern HiL formed by the left headlight 5L and a low-beam light distribution pattern LoR formed by the right headlight 5R. The left-side high-beam light distribution pattern HiL is formed by turning on both of the high-beam light source 12 and the low-beam light source 13 of the left headlight 5L and setting the shade mechanism 20 of the left headlight 3L in the left-side illumination mode. The low-beam light distribution pattern LoR is formed by turning on only the low-beam light source 13 of the right headlight 5R and setting the shade mechanism 20 of the right headlight 5R in the low-beam illumination mode.

Figure 4D:
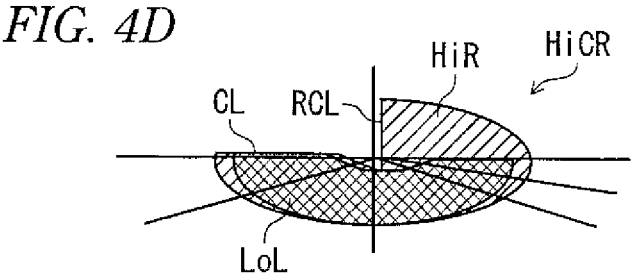

FIG. 4D shows a right-side high-beam illumination pattern HiCR. This light distribution pattern is suitable for a case that a front vehicle or a pedestrian exists on its own lane side and no oncoming vehicle or pedestrian exists on the opposite lane side. This light distribution pattern is to prevent the driver/passenger of a preceding vehicle or a pedestrian existing on its own lane side from seeing glare while increasing the forward visibility of the driver.

The right-side high-beam illumination pattern HiCR is formed by combining a right-side high-beam light distribution pattern HiR formed by the right headlight 5R and a low-beam light distribution pattern LoL formed by the left headlight 5L. The right-side high-beam light distribution pattern HiR is formed by turning on both of the high-beam light source 12 and the low-beam light source 13 of the right headlight 5R and setting the shade mechanism 20 of the right headlight 5R in the right-side illumination mode. The low-beam light distribution pattern LoL is formed by turning on only the low-beam light source 13 of the left headlight 5L and setting the shade mechanism 20 of the left headlight 5L in the low-beam illumination mode.

Figure 4E:
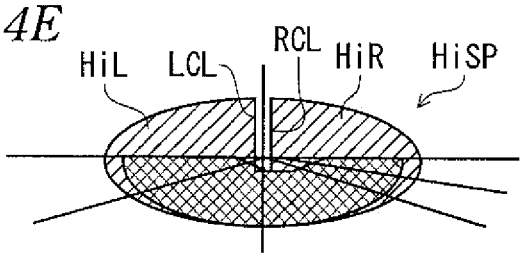

FIG. 4E shows a split light distribution pattern HiSP. This light distribution pattern is suitable for a case that a front vehicle or a pedestrian exists on both of its own lane side and the opposite lane side, and is to prevent the driver/passenger of such a front preceding vehicle or such a pedestrian from seeing glare while increasing the forward visibility of the driver.

The split light distribution pattern HiSP is formed by combining a left-side high-beam light distribution pattern HiL formed by the left headlight 5L and a right-side high-beam light distribution pattern HiR formed by the right headlight 5R. A non-illumination region is formed between the left longitudinal cutoff line LCL of the left-side high-beam light distribution pattern HiL and the right longitudinal cutoff line RCL of the right-side high-beam light distribution pattern HiR. The unified control unit 3 controls the swivel mechanism 30 to swing the optical axes Ax of the left and right lamp units 10 leftward and rightward, respectively, whereby the positions of the left longitudinal cutoff line LCL and the right longitudinal cutoff line RCL are adjusted so that the detected front vehicle and/or the pedestrian are located inside the non-illumination region.

The unified control unit 3 detects a front vehicle based on an image acquired by the camera 4. The term "front vehicle" means a vehicle running on its own lane ahead of the self vehicle and an oncoming vehicle running on the opposite lane. As such, the unified control unit 3 and the camera 4 functions as a detector. An image acquired by the camera 4 can be regarded as a signal indicating a front vehicle, and the unified control unit 3 functions as a signal acquiring unit for acquiring this signal.

When a front vehicle is detected, the unified control unit 3 forms a split light distribution pattern HiSP shown in FIG. 4E. To this end, the unified control unit 3 forms a right-side high-beam light distribution pattern HiR shown in FIG. 4D. More specifically, the unified control unit 3 forms, in the illumination region of the right headlight 5R, a non-illumination region that includes a region on the left of the right longitudinal cutoff line RCL by controlling the shade mechanism 20 of the right headlight 5R. The unified control unit 3 also forms a left-side high-beam light distribution pattern HiL shown in FIG. 4C. More specifically, the unified control unit 3 forms, in the illumination region of the left headlight 5L, a non-illumination region that includes a region on the right of the left longitudinal cutoff line LCL by controlling the shade mechanism 20 of the left headlight 5L.

Then, the unified control unit 3 forms a split light distribution pattern HiSP by combining the above-formed right-side high-beam light distribution pattern HiR and left-side high-beam light distribution pattern HiL. By controlling the swivel mechanisms 30 of the left headlight 5L and the right headlight 5R, the unified control unit 3 determines a non-illumination region so that the detected front vehicle is interposed between the right longitudinal cutoff line RCL and the left longitudinal cutoff line LCL.

That is, a non-illumination region is formed in the illumination regions of the headlights 5L and 5R by the shade mechanisms 20 and the swivel mechanisms 30 which are non-illumination region forming units. The unified control unit 3 which is a light distribution controller outputs signals for controlling the swivel mechanisms 30 so that the detected front vehicle is located in the non-illumination region.

The position of the front vehicle relative to the self vehicle 2 varies depending on their running states. In other words, the position of the front vehicle is displaced leftward or rightward in an image, captured by the camera 4, of a front region of the self vehicle 2. The unified control unit 3 which is an information acquiring unit acquires information relating to a displacement direction and a displacement speed (i.e., a displacement per unit time) of the front vehicle from the image captured by the camera 4.

The unified control unit 3 which is the light distribution controller controls the swivel mechanisms 30 so as to increase the interval between the front vehicle and the right longitudinal cutoff line RCL or the left longitudinal cutoff line LCL (the longitudinal cutoff lines RCL and LCL are boundary lines of the non-illumination region) based on the acquired information.

Figure 5A:
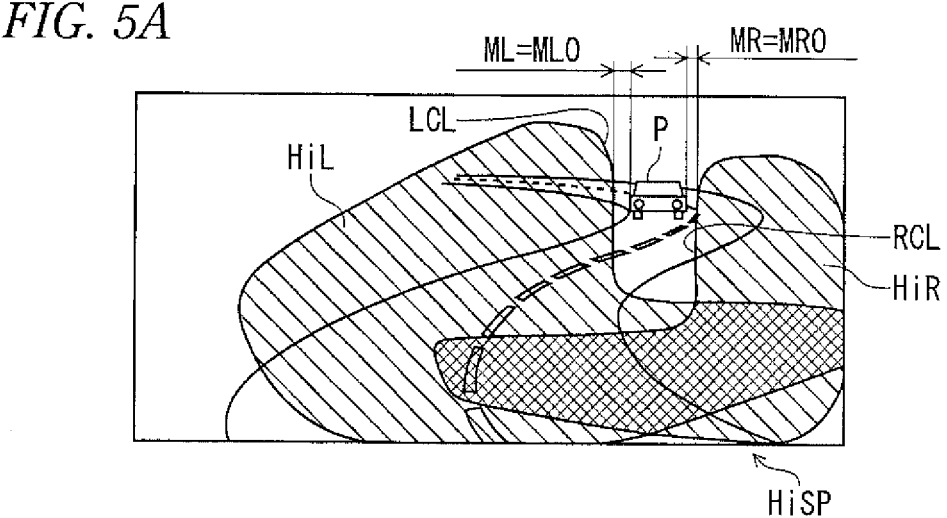
FIGS. 5A-5C illustrate an interval control process which is executed by the control system.

The above control will be described in more detail with reference to FIGS. 5A-5C and FIG. 6. FIG. 5A shows a state that a preceding vehicle P has been detected ahead of the self vehicle 2. By controlling the shade mechanisms 20 and the swivel mechanisms 30, the unified control unit 3 performs light distribution controls so that the preceding vehicle P is located in the non-illumination region formed between the right longitudinal cutoff line RCL and the left longitudinal cutoff line LCL. The interval ML between the left end of the preceding vehicle P and the left longitudinal cutoff line LCL is set equal to an initial value ML0. The interval MR between the right end of the preceding vehicle P and the right longitudinal cutoff line RCL is set equal to an initial value MR0.

Figure 5B:
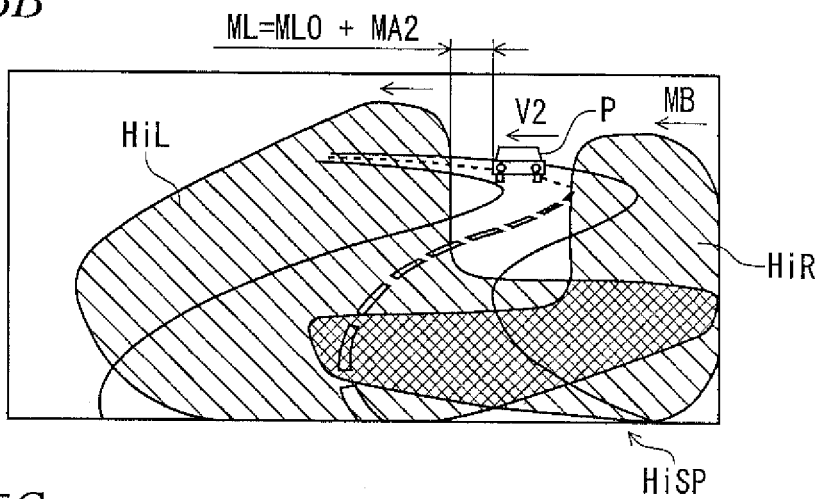
Figure 6:
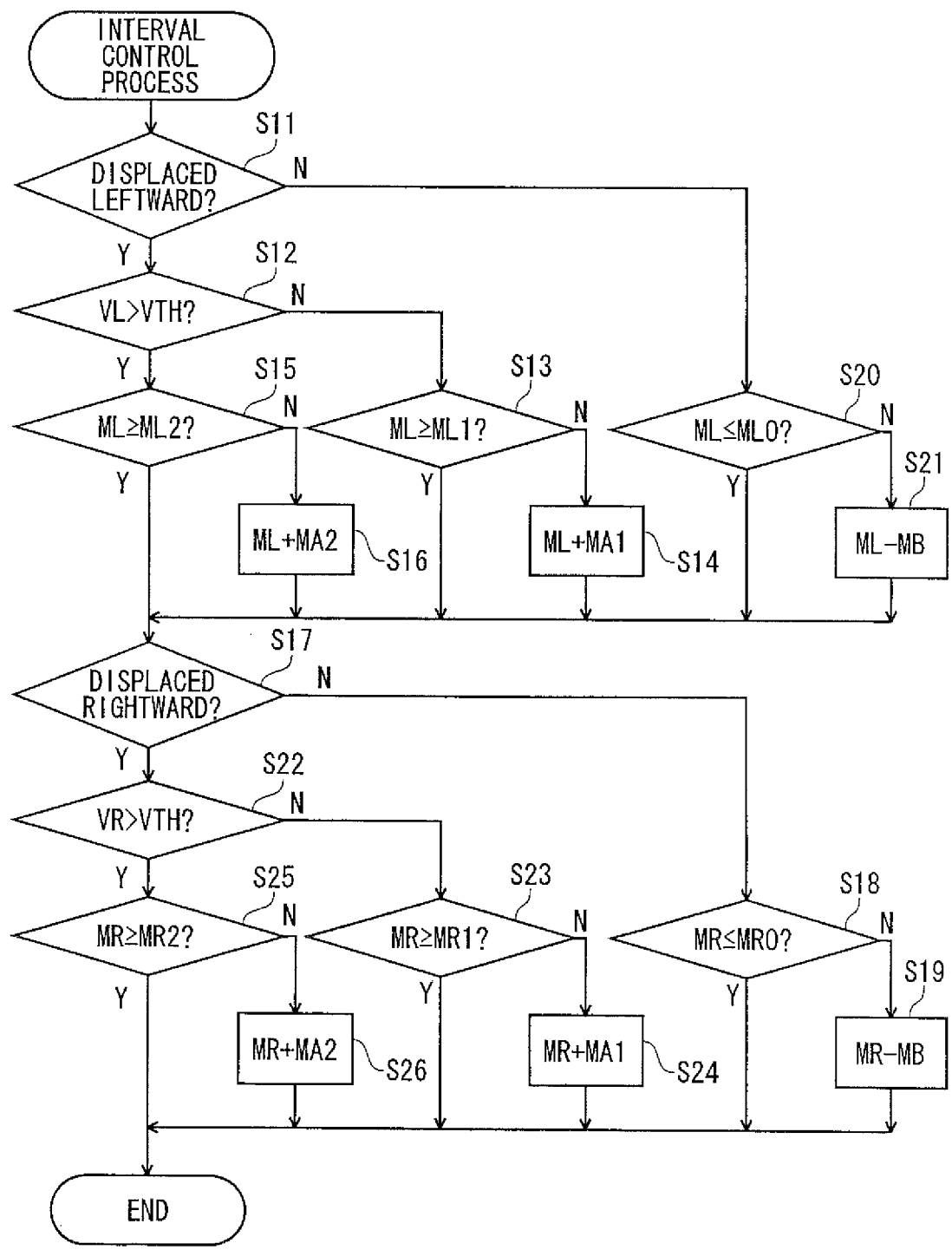
FIG. 6 is a flowchart of the interval control process.

Upon a start of an interval control process shown in a flowchart of FIG. 6, at step S11 the unified control unit 3 determines whether or not the preceding vehicle P is being displaced leftward. FIG. 5B shows a state that the preceding vehicle P has entered a left-curved road. In this case, the preceding vehicle P is displaced leftward in the image of the front region taken by the camera 4.

If leftward displacement of the preceding vehicle P is detected (S11: Y) as in this example, the unified control unit 3 calculates a leftward displacement per unit time, that is, a displacement speed VL, of the preceding vehicle P. For example, a displacement speed VL can be calculated by determining a detected displacement of a reference point of the preceding vehicle P in the form of the number of pixels in the image acquired by the camera 4 and dividing the number of pixels by a time taken by the displacement.

At step S12, the unified control unit 3 determines whether or not the calculated displacement speed VL is higher than a prescribed threshold value VTH. If the displacement speed VL is lower than or equal to the threshold value VTH (S12: N), at step S13 the unified control unit 3 determines whether or not the interval ML between the left end of the preceding vehicle P and the boundary line of the non-illumination region located on the destination side of the displacement direction of the preceding vehicle P, that is, the left longitudinal cutoff line LCL, is longer than or equal to a threshold value ML1.

The threshold value ML1 is set at such a value that a preceding vehicle whose displacement speed is lower than or equal to the threshold value VTH can be placed in a non-illumination region with a sufficient margin. If the interval ML is shorter than the threshold value ML1 (S13: N), at step S14 the unified control unit 3 controls the swivel mechanism 30 of the left headlight 5L so that the interval ML is increased by a value MA1. If the interval ML is longer than or equal to the threshold value ML1 (S13: Y), the process moves to step S17.

If the displacement speed VL of the preceding vehicle P is higher than the threshold value VTH (S12: Y), at step S15 the unified control unit 3 determines whether or not the interval ML between the left end of the preceding vehicle P and the boundary line of the non-illumination region located on the destination side of the displacement direction of the preceding vehicle P, that is, the left longitudinal cutoff line LCL, is longer than or equal to a threshold value ML2.

The threshold value ML2 is set at such a value that the preceding vehicle P whose displacement speed is higher than the threshold value VTH can be positioned in a non-illumination region with a sufficient margin. Therefore, the threshold value ML2 is set larger than the threshold value ML1.

If the interval ML is shorter than the threshold value ML2 (S15: N), at step S16 the unified control unit 3 controls the swivel mechanism 30 of the left headlight 5L so that the interval ML is increased by a value MA2 which is set larger than the value MA1. In the state of FIG. 5B, since the preceding vehicle P is being displaced at a speed V2 which is higher than the threshold value VTH, the unified control unit 3 makes the interval ML equal to ML0+ML2. If the interval ML is longer than or equal to the threshold value ML2 (S15: Y), the process moves to step S17.

At step S17, the unified control unit 3 determines whether or not the preceding vehicle P is being displaced rightward. In the example of FIG. 5B, since the preceding vehicle P is being displaced leftward (S17: N), at step S18 the unified control unit 3 determines whether or not the interval MR between the right end of the preceding vehicle P and the boundary line of the non-illumination region located on the side opposite to the destination side of the displacement direction of the preceding vehicle P, that is, the right longitudinal cutoff line RCL, is shorter than or equal to an initial value MR0.

If determining that the interval MR is longer than the initial value MR0 (S18: N), at step S19 the unified control unit 3 controls the swivel mechanism 30 of the right headlight 5R so that the interval MR is decreased by a value MB which is set smaller than or equal to the above value MA1. If determining that the interval MR is shorter than or equal to the initial value MR0 (S18: Y), the process is ended.

In the example of FIG. 5B, the interval MR comes to exceed the initial value MR0 as the preceding vehicle P is displaced leftward and hence is decreased by the value MB. The right longitudinal cutoff line RCL is displaced leftward so as to follow the displacement of the preceding vehicle P.

After the execution of the above steps, the interval control process is finished. And the interval control process is repeatedly executed starting from the step S11. For example, in a state shown in FIG. 5C, the preceding vehicle P is being displaced leftward at the speed V1 which is lower than or equal to the threshold value VTH (S11: Y; S12: N). Therefore, the unified control unit 3 controls the swivel mechanism 30 of the left headlight 5L so as to increase the interval ML by the value MA1. As a result, the interval ML is made equal to ML0+MA2+MA1. On the other hand, the unified control unit 3 controls the swivel mechanism 30 of the right headlight 5R so that the interval MR is further decreased by the value MB.

As the interval control process is executed repeatedly in the above-described manner, the left longitudinal cutoff line LCL is displaced leftward until the interval ML1 or ML2 is obtained with which a sufficient margin of separation of the left longitudinal cutoff line LCL from the left end of the preceding vehicle P can be secured. On the other hand, the right longitudinal cutoff line RCL is displaced leftward following the displacement of the preceding vehicle P until the interval MR between the right end of the preceding vehicle P and the right longitudinal cutoff line RCL becomes equal to the initial value MR0.

In the above control process, when leftward displacement of the preceding vehicle P is detected, the interval ML between the left end of the vehicle P and the left longitudinal cutoff line LCL is increased actively so that the left longitudinal cutoff line LCL goes away from the preceding vehicle P. This makes it possible to secure a larger margin of separation of the left longitudinal cutoff line LCL from the left end of the preceding vehicle P than in the conventional follow control which attempts to maintain a constant interval, while suppressing the control load. Therefore, the above control process can greatly decrease the probability that the driver/passenger of the preceding vehicle P suffers glare due to left-side high-beam illumination. Furthermore, since an interval control does not vary the left-side high-beam light distribution pattern HiL itself that is formed by the left headlight 5L, the visibility of regions around the non-illumination region is not lowered.

In the above control process, the interval ML is increased if the leftward displacement speed VL of the preceding vehicle P is higher than the threshold value VTH. In other words, the rate of increasing the interval ML is varied according to the displacement speed of the vehicle P. This makes it possible to properly set the margin of separation of the left longitudinal cutoff line LCL from the left end of the preceding vehicle P.

The above description is directed to the case the preceding vehicle P is detected, a similar control process is also executed when an oncoming vehicle is detected. Since an oncoming vehicle has a higher apparent displacement speed than a preceding vehicle, the effect of securing a margin by actively increasing the interval ML is more remarkable. That is, the probability that the driver/passenger of a front vehicle having a high displacement speed is given a glare because the position of a non-illumination region cannot follow the front vehicle and the front vehicle enters an illumination region.

Figure 5C:
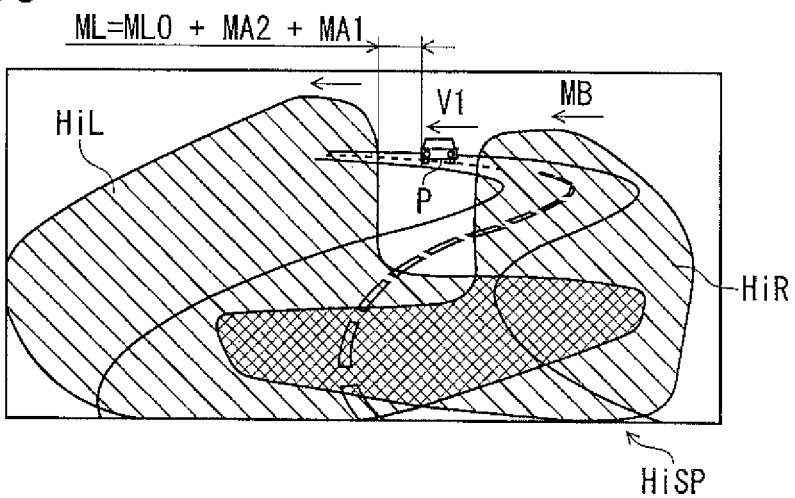
Figure 7A:
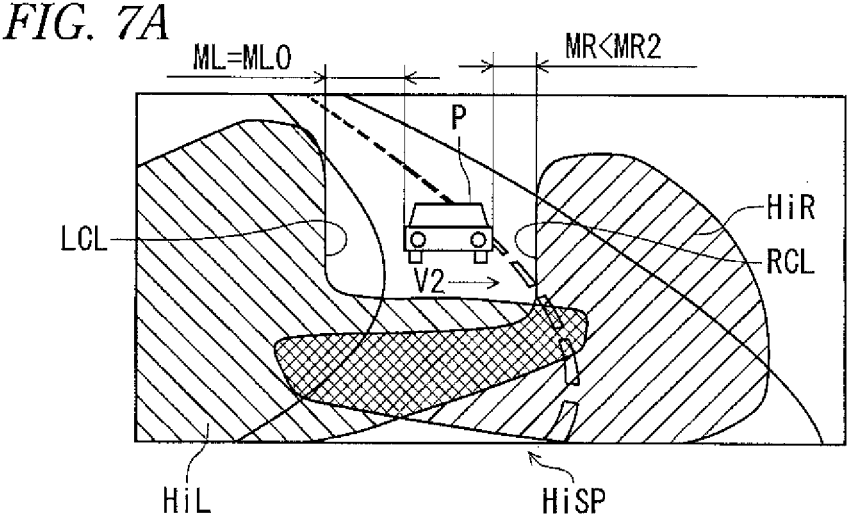
FIGS. 7A-7C also illustrate the interval control process.

FIG. 7A shows a state that the preceding vehicle P is passing through the left-curved road shown in FIG. 5C and entering a straight road. In this case, the preceding vehicle P is displaced rightward (S11: N). Therefore, the unified control unit 3 determines that it is no longer necessary to continue the control for moving the left longitudinal cutoff line LCL leftward (increasing the interval ML). Conversely, the unified control unit 3 controls the swivel mechanism 30 of the left headlight 5L so that the left longitudinal cutoff line LCL is displaced rightward (the interval ML is decreased).

More specifically, at step S20, the unified control unit 3 determines whether or not the interval ML between the left end of the preceding vehicle P and the boundary line of the non-illumination region located on the side opposite to the destination side of the displacement direction of the preceding vehicle P, that is, the left longitudinal cutoff line LCL, is shorter than or equal to an initial value ML0.

Figure 7B:
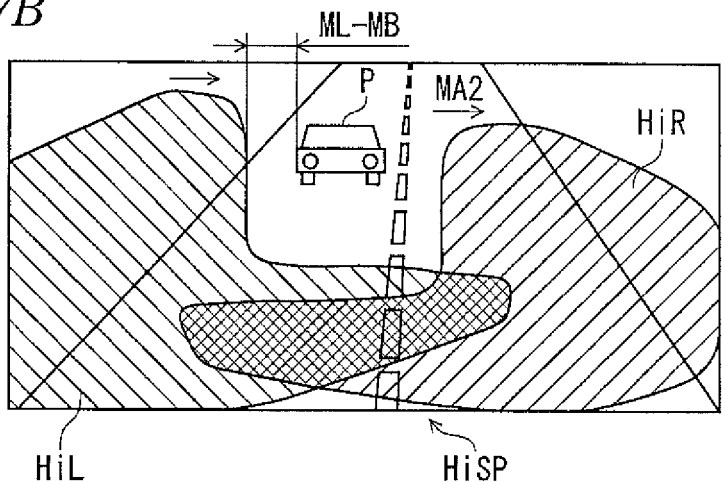

If determining that the interval ML is longer than the initial value ML0 (S20: N), at step S21 the unified control unit 3 controls the swivel mechanism 30 of the left headlight 5L so that the interval ML is decreased by a value MB. As shown in FIG. 7B, the left longitudinal cutoff line LCL is displaced rightward following the displacement of the preceding vehicle P and the interval ML is changed to ML−MB. If determining that the interval ML is shorter than or equal to the initial value ML0 (S20: Y), the process moves to step S17.

At step S17, the unified control unit 3 determines whether or not the preceding vehicle P is being displaced rightward. Since the preceding vehicle P is being displaced rightward (S17: Y), at step S22 the unified control unit 3 determines whether or not a displacement speed VR of the preceding vehicle P is higher than a prescribed threshold value VTH. If the displacement speed VL is lower than or equal to the threshold value VTH (S22: N), at step S23 the unified control unit 3 determines whether or not the interval MR between the right end of the preceding vehicle P and the boundary line of the non-illumination region located on the destination side of the displacement direction of the preceding vehicle P, that is, the right longitudinal cutoff line RCL, is longer than or equal to a threshold value MR1.

The threshold value MR1 is set at such a value that a preceding vehicle whose displacement speed is lower than or equal to the threshold value VTH can be positioned in a non-illumination region with a sufficient margin. If the interval MR is shorter than the threshold value MR1 (S23: N), at step S24 the unified control unit 3 controls the swivel mechanism 30 of the right headlight 5R so that the interval MR is increased by a value MA1. If the interval MR is longer than or equal to the threshold value MR1 (S23: Y), the process is ended.

If the displacement speed VR of the preceding vehicle P is higher than the threshold value VTH (S22: Y), at step S25 the unified control unit 3 determines whether or not the interval MR between the right end of the preceding vehicle P and the boundary line of the non-illumination region located on the destination side of the displacement direction of the preceding vehicle P, that is, the right longitudinal cutoff line RCL, is longer than or equal to a threshold value MR2. The threshold value MR2 is set at such a value that a preceding vehicle whose displacement speed is higher than the threshold value VTH can be placed in a non-illumination region with a sufficient margin. Therefore, the threshold value MR2 is set larger than the threshold value MR1.

If the interval MR is shorter than the threshold value MR2 (S25: N), at step S26 the unified control unit 3 controls the swivel mechanism 30 of the right headlight 5R so that the interval MR is increased by a value MA2 which is set larger than the value MA1. In the state of FIG. 7A, the preceding vehicle P is being displaced at a speed V2 which is higher than the threshold value VTH and the interval MR is shorter than the threshold value MR2. Therefore, the unified control unit 3 performs a control for increasing the interval MR by the value MA2. If the interval ML is longer than or equal to the threshold value MR2 (S25: Y), the process is finished.

Figure 7C:
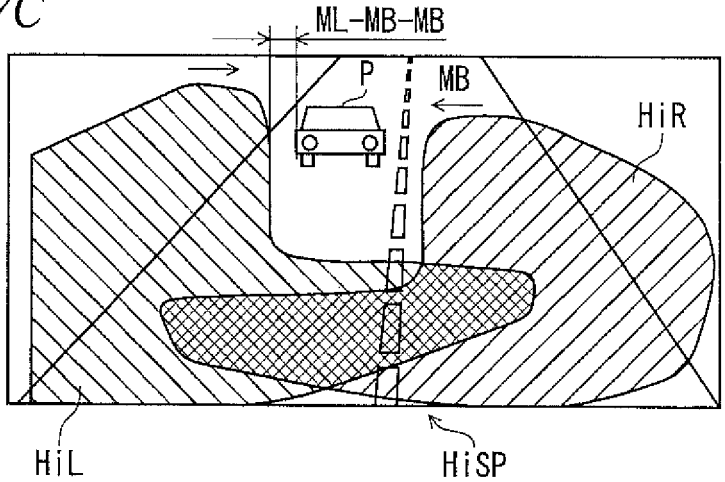

After the execution of the above steps, the interval control process is ended. The interval control process is repeatedly executed starting from the step S11. For example, in a state shown in FIG. 7C, the preceding vehicle P is running straightly and hence is not being displaced leftward or rightward (S11: N, S17: N). Therefore, at steps S20 and S18, the unified control unit 3 determines whether or not the intervals ML and MR are smaller than or equal to the respective initial values ML0 and MR0. It is assumed here that the intervals ML and MR are larger than the respective initial values ML0 and MR0.

Therefore, the unified control unit 3 controls the swivel mechanisms 30 of the left headlight 5L and the right headlight 5R so that each of the intervals ML and MR is decreased by the value MB. As a result, the left longitudinal cutoff line LCL is displaced rightward and the interval ML is decreased by the value MB. The right longitudinal cutoff line RCL is displaced leftward and the interval MR is decreased by the value MB.

As the interval control process is executed repeatedly in the above-described manner, the right longitudinal cutoff line RCL is displaced rightward until the interval MR1 or MR2 is obtained with which a sufficient margin of separation of the right longitudinal cutoff line RCL from the right end of the preceding vehicle P can be secured. On the other hand, the left longitudinal cutoff line LCL is displaced rightward following the displacement of the preceding vehicle P until the interval ML between the left end of the preceding vehicle P and the left longitudinal cutoff line LCL becomes equal to the initial value ML0.

As described above, the value MB for interval decrease is set smaller than or equal to the value MA1 for interval increase. It is inevitable that rapid displacement of the left longitudinal cutoff line LCL causes the driver to feel uncomfortable. However, in a control of increasing the interval ML, when a preceding vehicle P is being displaced leftward, the left longitudinal cutoff line LCL is displaced relatively fast in the displacement direction of the preceding vehicle P to give higher priority to avoidance of suffering from glare. On the other hand, in a control of returning an increased interval ML to the initial value which is less urgent, the interval ML is returned at a lower rate than in the control of increasing it, to prevent the driver from feeling uncomfortable.

As described above with reference to FIG. 7C, if determining that the displacement of the preceding vehicle P has stopped, a control is performed so that the interval MR between the right end of the preceding vehicle P and the boundary line of the non-illumination region located on the destination side of the displacement direction of the preceding vehicle P, that is, the right longitudinal cutoff line RCL, comes closer to the initial value MR0. That is, in a situation that it is not necessary to secure a sufficient margin of separation from the preceding vehicle P, the interval MR is minimized to increase the forward visibility. This also applies to the control relating to the left longitudinal cutoff line LCL.

For example, another situation is conceivable in which both of a preceding vehicle and an oncoming vehicle are detected and appear to be moving leftward and rightward, respectively. In this case, an affirmative determination is made at both steps S11 and S17. Therefore, both of the control for increasing the interval ML between the left end of the preceding vehicle and the left longitudinal cutoff line LCL and the control of increasing the interval MR between the right end of the oncoming vehicle and the right longitudinal cutoff line RCL are performed.

The above embodiment is just to facilitate understanding of the invention and should not be construed as restricting the invention. It is apparent that various changes and modifications are possible without departing from the spirit of the invention and that the scope of the invention encompasses the scope as defined by the claims as well as equivalents thereof.

The unified control unit 3 is not always required to acquire information relating to a displacement direction and a displacement speed of a front vehicle from an image of a front region of the vehicle 2 that is acquired by the camera 4. The unified control unit 3 as the information acquiring unit may be configured so as to acquire such information from outside the vehicle 2.

For example, a displacement direction and a displacement speed of a front vehicle can be predicted based on GPS information acquired by the navigation system 6. More specifically, if it is determined based on map information that a large left-curved road exists ahead of the self vehicle, it is expected that a front vehicle will be displaced leftward at a relatively high displacement speed. The unified control unit 3 can secure, in advance, a margin of separation of a left longitudinal cutoff line LCL from the front vehicle to be displaced leftward by performing a control for displacing the left longitudinal cutoff line LCL leftward in advance based on the above expectation.

It is also possible to acquire information relating to a displacement direction and a displacement speed of a front vehicle by acquiring information relating to a position of the front vehicle and states of roads ahead by performing an inter-vehicle communication or a road-vehicle communication and displace a longitudinal cutoff line accordingly in advance.

Although such a prediction-based control is inevitably lower in accuracy than a control that is performed based on an actual state of a front vehicle acquired by the camera 4, the former makes it possible to secure a margin earlier with a relatively low computation load.

A prediction-based control which is relatively low in computation load and a higher accuracy control which is performed based on an image of a front region that is acquired by the camera may be used complementarily. For example, if an oncoming vehicle being displaced rightward is detected in an image of a front region acquired by the camera 4 in a state that presence of a left-curved road ahead has been recognized based on map information and a control for displacing a left longitudinal cutoff line LCL leftward has been performed, the prediction-based control is canceled and switching is made to a control for increasing the interval MR from the oncoming vehicle by displacing the right longitudinal cutoff line RCL rightward. This complementary method makes it possible to reliably prevent the front vehicle from begin given glare while lowering the computation load in ordinary situations.

The number of steps of increase of the interval between a front vehicle and the boundary line of a non-illumination region is not necessarily restricted to two (the embodiment employs the two values MA1 and MA2). Three or more steps of increase may be set by setting three or more threshold values relating to the displacement speed within an allowable range of the control load. As a further alternative, the increase of the interval may be varied continuously according to the displacement speed of a front vehicle by holding, in the form of a function, a relationship between the displacement speed of a front vehicle and the interval increase (increase speed).

The high-beam light source 12 and the low-beam light source 13 of each headlight 5 are not restricted to LEDs, and may be semiconductor light-emitting devices such as laser diodes or organic EL devices or known bulb light sources such as halogen lamps or HID (high-intensity discharge) lamps.

At least the high-beam light source 12 may be an array light source which is an array of plural semiconductor light-emitting devices. In this case, an illumination possible region is formed by plural divisional regions corresponding to the respective semiconductor light-emitting devices and an illumination region and a non-illumination region are formed in the illumination possible region by controlling the turning on/off of the semiconductor light-emitting devices individually. The invention can also be applied to that is called an electronic swivel control which employs such an array light source and turns on/off the semiconductor light-emitting devices so that a detected front vehicle is included in a non-illumination region.

In this case, longitudinal cutoff lines are formed at the boundaries between an illumination region corresponding to lit semiconductor light-emitting devices and a non-illumination region corresponding to unlit semiconductor light-emitting devices. If displacement of a front vehicle in a certain direction is detected, semiconductor light-emitting devices to be turned off are determined so that the interval between the front vehicle and a longitudinal cutoff line located on the destination side of the displacement direction.

The unit for detecting a front vehicle is not limited to the camera 4. For example, a radar sensor may be used to detect the left end and the right end of a front vehicle.

Each of the terms "left end" and "right end" of a front vehicle which are used in the above description include any thing capable of indicating a left end portion or a right end portion of the front vehicle such as a boundary of the vehicle body or a left or right tail lamp.

The control system 1 may be configured such that the functions of the detector, the information acquiring unit, and the light distribution controller which are realized by the unified control unit 3 are performed at least partially by lamp control modules (not shown) provided in the respective headlights 5L and 5R.

The present invention is not limited to each embodiment described above, the embodiments can be combined respectively, modifications such as various design modifications can be applied based on knowledge of a person skilled in the art, and the combined embodiments or the modified embodiments are also included in the scope of the present invention. The above-described embodiments and new embodiments generated by combining the embodiments and modifications have effects of each of the combined embodiments and modifications.

What is claimed is:

1. A lamp control system comprising:
  a lamp configured to form a light distribution pattern ahead of a vehicle using a non-illumination forming unit, wherein the light distribution pattern comprises an illumination region and a non-illumination region, and the illumination region comprises at least one longitudinal cutoff line at a boundary between the illumination region and the non-illumination region;
  a detector configured to detect a front vehicle in front of the vehicle;
  an information acquiring unit configured to acquire a displacement direction and a displacement speed of the front vehicle; and
  a light distribution controller configured to control the light distribution pattern using the non-illumination region forming unit such that the front vehicle detected by the detector is positioned in the non-illumination region with a predetermined interval between the longitudinal cutoff line and the front vehicle, wherein when the front vehicle is approaching the longitudinal cutoff line, the light distribution controller is configured to control the light distribution pattern based on the displacement direction and the displacement speed so as to increase the predetermined interval between the longitudinal cutoff line and the front vehicle by a first predetermined value, and wherein when the front vehicle is moving away from the longitudinal cutoff line, the light distribution controller is configured to control the light distribution pattern based on the displacement direction and the displacement speed so as to decrease the predetermined interval between the longitudinal cutoff line and the front vehicle by a second predetermined value.

2. The system of claim 1, wherein the light distribution controller is configured to change an increase rate of the interval depending on the displacement speed.

3. The system of claim 2, wherein
the light distribution controller is configured to increase the interval by a first value when the displacement speed is larger than or equal to a threshold speed,
the light distribution controller is configured to increase the interval by a second value when the displacement speed is smaller than the threshold speed, and
the second value is larger than the first value.

4. The system of claim 1, wherein the predetermined interval is increased at a certain increase rate, the predetermined interval is decreased at a certain decrease rate, and
the certain decrease rate is smaller than the certain increase rate.

5. The system of claim 1, wherein
the light distribution pattern is a split light distribution pattern comprising a left longitudinal cutoff line and a right longitudinal cutoff line, which are opposed to each other in a vehicle left-right direction, and
when the front vehicle is approaching the left longitudinal cutoff line, the light distribution controller is configured to control the light distribution pattern based on the displacement direction and the displacement speed to increase an interval between the left longitudinal cutoff line and the front vehicle while decreasing an interval between the right longitudinal cutoff line and the front vehicle.

6. The system of claim 1, wherein the information acquiring unit is configured to acquire the displacement direction and the displacement speed from outside the vehicle.

7. The system of claim 1, wherein
the detector is a camera configured to capture an image of a region ahead of the vehicle, and
the information acquiring unit is configured to acquire the displacement direction and the displacement speed from the image captured by the detector.

8. The system of claim 1, wherein the lamp comprises:
a light source configured to emit light; and
the non-illumination region forming unit configured to block a portion of the light emitted from the light source to form the light distribution pattern.

9. A control device for controlling a light distribution pattern, wherein a lamp is configured to form the light distribution pattern ahead of a vehicle using a non-illumination region forming unit, and the light distribution pattern comprises an illumination region and a non-illumination region, and the illumination region comprises at least one longitudinal cutoff line at a boundary between the illumination region and the non-illumination region, the control device comprising:

a signal acquiring unit configured to acquire a signal that represents a front vehicle ahead of the vehicle;

an information acquiring unit configured to acquire a displacement direction and a displacement speed of the front vehicle; and a light distribution controller configured to control the light distribution pattern using the non-illumination region forming unit such that the front vehicle is positioned in the non-illumination region with a predetermined interval between the longitudinal cutoff line and the front vehicle, wherein when the front vehicle is approaching the longitudinal cutoff line, the light distribution controller is configured to control the light distribution pattern based on the displacement direction and the displacement speed so as to increase the interval between the longitudinal cutoff line and the front vehicle by a first predetermined value, and wherein when the front vehicle is moving away from the longitudinal cutoff line, the light distribution controller is configured to control the light distribution pattern based on the displacement direction and the displacement speed so as to decrease the predetermined interval between the longitudinal cutoff line and the front vehicle by a second predetermined value.

* * * * *